US005687774A

United States Patent [19]

Chiang

[11] Patent Number: 5,687,774

[45] Date of Patent: Nov. 18, 1997

[54] FLEXIBLE LAMP TUBE FOR CONNECTING A LAMP AND A LAMP BASE

[76] Inventor: Hanh Chiang, No. 162, Chung-Cheng S. Rd., Hsin-Ying Hsiang, Tainan Hsien, Taiwan

[21] Appl. No.: 581,321

[22] Filed: Dec. 29, 1995

[51] Int. Cl.[6] .................... F16L 11/11

[52] U.S. Cl. .................... 138/121; 138/138; 138/143; 138/173; 138/DIG. 8; 174/110 F

[58] Field of Search .................... 138/121, 119, 138/114, 138, 143, 173, DIG. 8; 174/68.2, 95, 110 F

[56] References Cited

U.S. PATENT DOCUMENTS

| | | | |
|---|---|---|---|
| 1,790,500 | 1/1931 | Fischer | 138/138 |
| 2,759,765 | 8/1956 | Pawley | 138/DIG. 8 |
| 3,561,492 | 2/1971 | Kauder et al. | 138/121 |
| 3,582,536 | 6/1971 | Miller | 138/121 |
| 4,214,147 | 7/1980 | Kraver | 138/173 |
| 4,307,754 | 12/1981 | Muratsubaki | 138/DIG. 8 |
| 4,368,350 | 1/1983 | Perelman | 174/110 F |
| 4,842,174 | 6/1989 | Sheppard et al. | 138/DIG. 8 |
| 4,866,212 | 9/1989 | Ingram | 174/110 F |
| 5,113,039 | 5/1992 | Guipe et al. | 174/110 F |

*Primary Examiner*—David Scherbel
*Assistant Examiner*—James F. Hook
*Attorney, Agent, or Firm*—Foley and Lardner

[57] ABSTRACT

A flexible lamp tube includes an elongated foam member, a metal wire, and an accordion plastic pipe. The foam member has a central bore extending through the length of the foam member. The metal wire extends through the central bore of the foam member. The accordion plastic pipe is sleeved around the foam member.

5 Claims, 5 Drawing Sheets

FLEXIBLE LAMP TUBE FOR CONNECTING A LAMP AND A LAMP BASE

BACKGROUND OF THE INVENTION

1. Field of the Invention

This invention relates to a flexible lamp tube for connecting a lamp and a lamp base, more particularly to a flexible lamp tube which is lightweight and has a large bending angle.

2. Description of the Related Art

Referring to FIG. 1, a conventional table lamp is shown to comprise a base 10, a lamp 12, a tube 11, and a flexible lamp tube 11 for connecting lamp 12 and the lamp base 10 which in turn is connected to a power source (not shown). The flexible lamp tube 11 includes a accordion stainless steel pipe 13, an accordion plastic pipe 14 sleeved around the accordion stainless steel pipe 13, and a tubular metal coil 15 which is received in the accordion stainless steel pipe 13, as best illustrated in FIG. 2, which is an enlarged view of the circle (A) in FIG. 1. Since most of the components of the flexible lamp tube 11 are made of metal, the flexible lamp tube 11 is relatively heavy and is inconvenient to carry from a place to another. In addition, the accordion stainless steel pipe 13 is formed by means of pressing and winding a strip of stainless steel into the configuration to be formed. This manufacturing process is complicated and time-consuming.

Referring to FIG. 3, a conventional flexible flashlight is shown to comprise a head portion 21 in which a bulb (not shown) is installed, a lamp base, which is in the form of a barrel 22 for receiving batteries (not shown) that are used as a power source, and a flexible lamp tube 20 which interconnects the head portion 21 and the barrel 22. A pair of electrical wires 23 are received in the flexible lamp in order to connect electrically the bulb in the head portion 21 to the batteries in the barrel 22. The flexible lamp tube 20 includes an elongated bendable plastic member 24 and an accordion plastic pipe 25. Because the components of the flexible lamp tube 20 is made of plastic, the weight of the flexible lamp tube 20 can be reduced. Therefore, such a conventional flexible flashlight may be carried conveniently from one place to another place. However, since the bendable plastic member 24 is formed of a plurality of sections 241 which are connected by means of ball-and-socket joints, these sections 24 can only move relative one another within a limited angle. Therefore, the bending angle of the flexible lamp tube 20 is limited.

SUMMARY OF THE INVENTION

It is therefore an object of the present invention to provide a flexible lamp tube which can overcome the disadvantages which are commonly associated with the above mentioned conventional lamp device.

According to the present invention, a flexible lamp tube comprises an elongated foam member having a central bore extending through a length thereof, a metal wire extending through the central bore of the foam member, and an accordion plastic pipe sleeved around the foam member.

In the preferred embodiment of the present invention, the metal wire is a copper wire. A pair of electrical wires extends through the central bore of the foam member.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
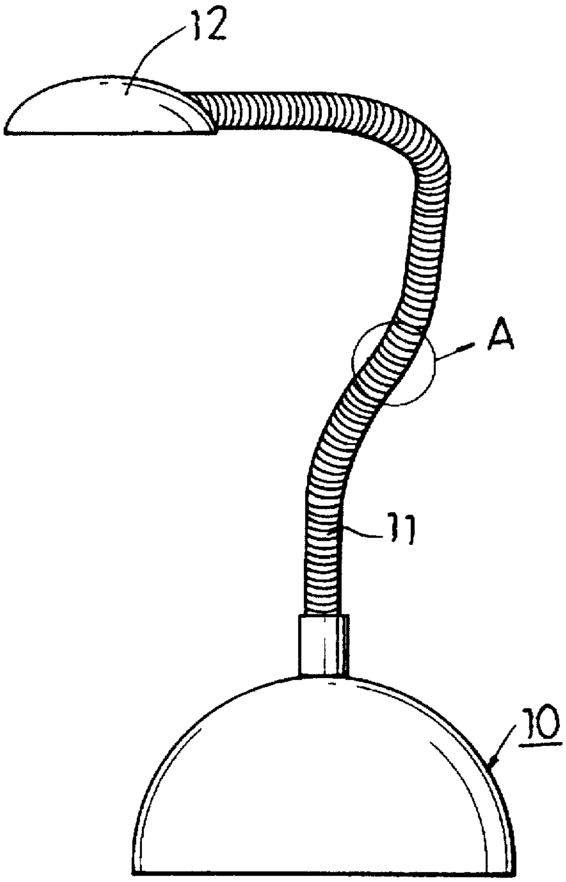
FIG.1 PRIOR ART
FIG. 1 is a perspective view of a conventional table lamp.
Figure 2:
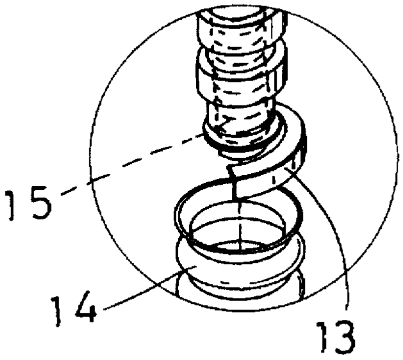
FIG.2 PRIOR ART
FIG. 2 is an enlarged view of the circle (A) of FIG. 1.
Figure 3:
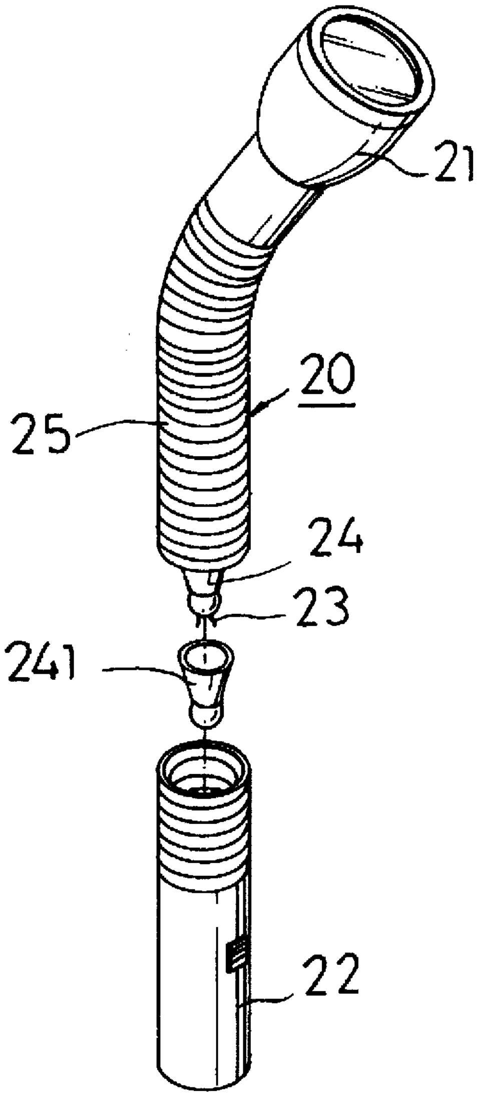
FIG. 3 PRIOR ART
FIG. 3 is an exploded view of a conventional flexible flashlight.
Figure 4:
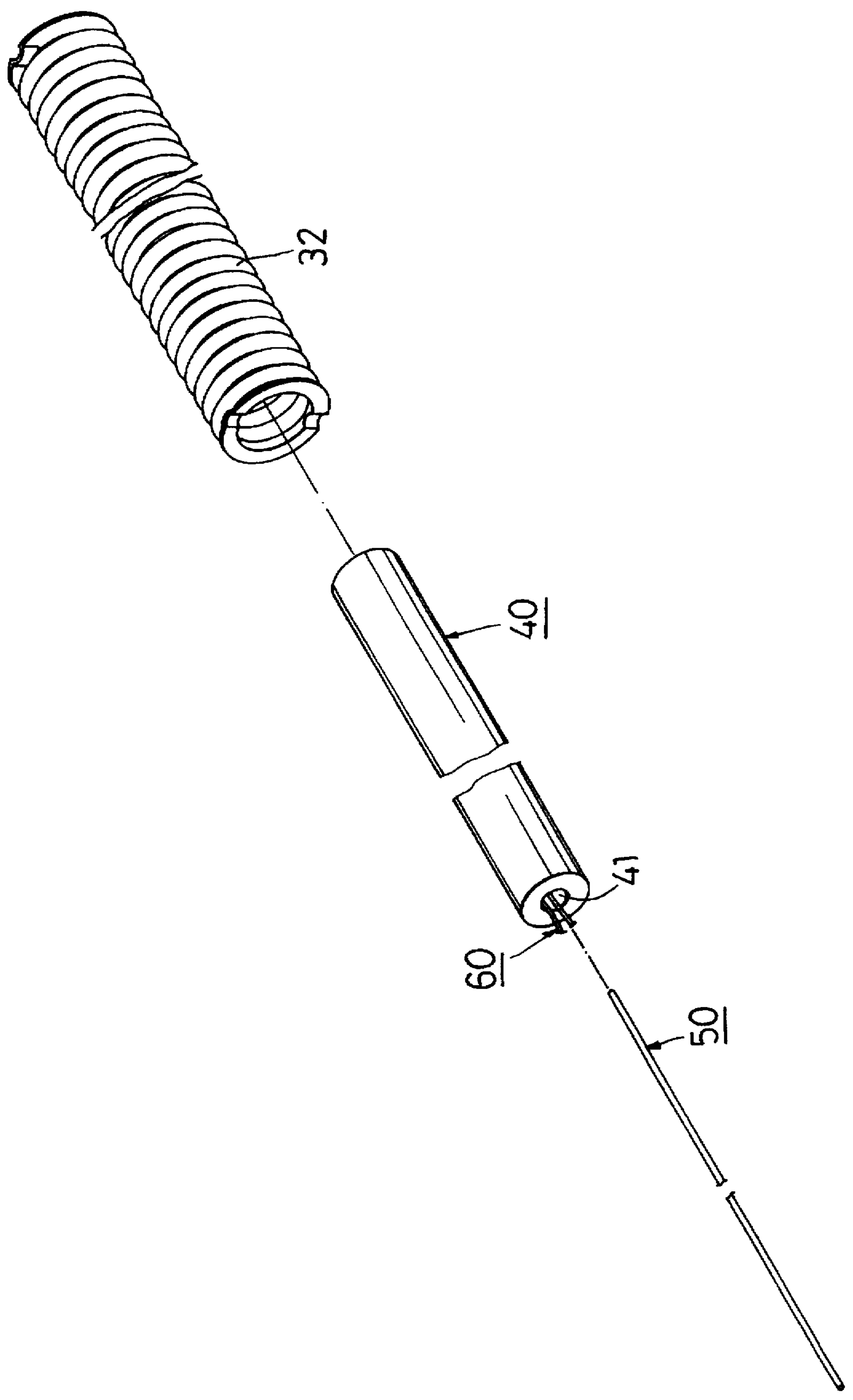
FIG. 4 is an exploded view of a preferred embodiment of a flexible lamp tube according to the present invention.

Referring to FIG. 4, a preferred embodiment of a flexible lamp tube according to the present invention is shown to comprise an elongated foam member 40, a metal wire 50, and an accordion plastic pipe 32.

Figure 5:
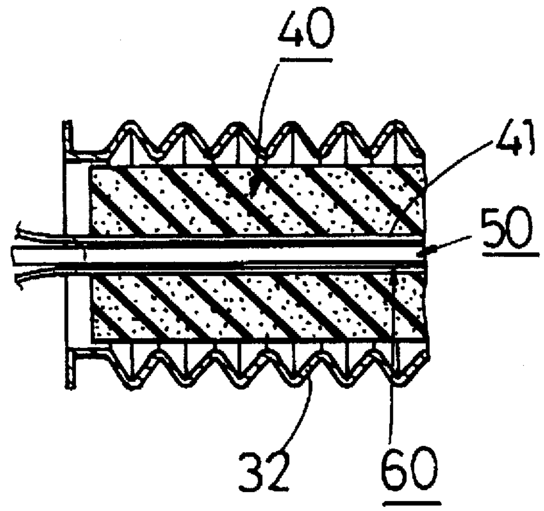
FIG. 5 is a fragmentary sectional view of the flexible lamp tube of the present invention.
Figure 6:
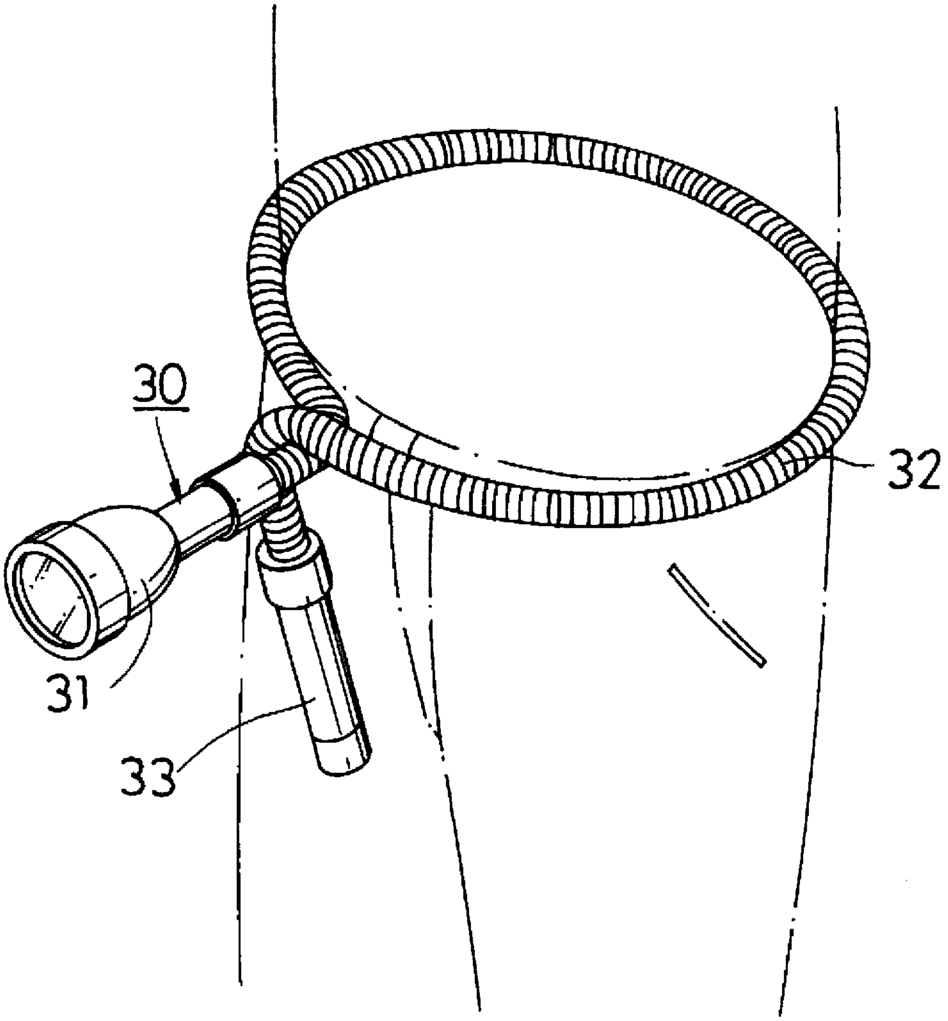
FIG. 6 is a perspective schematic view illustrating the flexible lamp tube when in use.

The foam member 40 has a central bore 41 extending through the length thereof. The metal wire 50 extends through the central bore 41 of the foam member 40, as shown in FIG. 5. The accordion plastic pipe 32 is sleeved around the foam member 40. The metal wire 50 is a copper wire and is used as a flexible support member for the flexible lamp tube. A pair of electrical wires 60 extend through the central bore 41 of the foam member 40 in order to interconnect electrically, for example, a head portion 31 of a flexible flashlight 30 and the batteries (not shown) in a barrel 33 of the flexible flashlight 30, as best illustrated in FIG. 6.

In use, the ends of the accordion plastic pipe 32 are connected to the head portion 31 and the barrel 33 of the flexible flashlight 30. When the flexible lamp tube is to be wrapped around the use's body for carrying purposes, it can be easily bent to form a circle because of the high flexibility of the metal wire 50 and foam member 40. In addition, the foam member 40 can protect the metal wire 50 and the electrical wires 60 and provide good sense of touch when the user bends the flexible lamp tube.

The advantages of the present invention are as follows:

(1) The foam member 40, the metal wire 50, and the accordion plastic pipe 32 can be easily manufactured and available. Therefore, the flexible lamp tube can be manufactured and assembled simply by inserting the metal wire 50 and the electrical wires 60 into the preformed foam member 40, and then inserting the foam member 40 into the accordion plastic pipe 32.

(2) Because most of the components of the flexible lamp tube are made of light materials, the flexible lamp tube is much lighter than the conventional flexible lamp tube.

(3) Since there are no joints in the metal wire 50, the bending angle of the metal wire 50 is much larger than that of the bendable plastic member 24 which has a plurality of ball-and-socket joints. Therefore, the flexible lamp tube of the present invention is highly flexible and can be bend into any shaped as desired.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A lamp comprising:

a lamp head;

a lamp base;

an elongated foam member connected between the lamp head and the lamp base and having a central bore extending through a length thereof;

a metal wire and a pair of electrical wires extending through said central bore of said foam member; and an accordion plastic pipe sleeved around said foam member.

2. A flexible lamp tube as claimed in claim 1, wherein said metal wire comprises a copper wire.

3. A flexible lamp comprising:

a lamp head;

a lamp base; and a flexible tube connecting the lamp head to the lamp base, wherein the flexible tube includes an elongated foam member having a central bore extending through a length thereof, a pair of electrical wires extending through the central bore of the foam member, and an accordion plastic pipe sleeved around said foam member, and wherein the flexible tube further includes a metal wire extending through said central bore of said foam member.

4. A flexible lamp as claimed in claim 3, wherein said metal wire comprises a copper wire.

5. A flexible lamp as claimed in claim 3, wherein said lamp base comprises a lamp barrel.

* * * * *